Patented June 23, 1953

2,643,226

UNITED STATES PATENT OFFICE 2,643,226

WATER FLUORIDATION AND IMPURITY COAGULATION

Wayne E. White, Tulsa, Okla., assignor to Ozark-Mahoning Company, Tulsa, Okla., a corporation of Delaware No Drawing. Application June 10, 1950, Serial No. 167,478

3 Claims. (Cl. 210—23)

It is now generally recognized that the presence of a small amount of fluorine in drinking water supplied to children is beneficial in reducing dental caries during adolescence and later life. In some instances appropriate amounts of fluorine are contained in natural water supplies, and when these are utilized as a source of water for municipalities of course no treatment of the water is necessary to provide the fluorine, but where the natural water is devoid of fluorine or contains less than the desired amount many municipalities are introducing it in appropriate quantities. This is known as "fluoridation" and is presently being practiced in some 25 municipalities in the United States.

Different ways of introducing the fluorine to the water are in vogue, that most commonly employed being to mix with the water, usually after it has passed through the filter beds, a suitable quantity of sodium fluoride (NaF) which is fairly soluble in the water and is a relatively inexpensive, readily obtainable material; in other cases infinitely soluble liquid hydrogen fluoride (HF) is released from appropriate containers into the water so as to mix therewith. But both of these fluoride-containing compounds are highly toxic and therefore must be handled with care not only from the standpoint of avoiding injury to the operatives of the water treating plant, but to prevent accidental or other introduction of excessive quantities to the water itself and consequent inimical effect on the consumers thereof; also hydrogen fluoride is extremely corrosive and consequently destructive of piping and other apparatus with which it comes into contact.

Irrespective of the presence or absence of fluorine, natural waters normally contain varying amounts of suspended matter, and it is therefore usual to remove a major portion of it by precipitation and subsequent filtration, the customary practice being to subject the water before its passage to or in the filter beds to an alum treatment for coagulating suspended matter in a flocculent precipitate which is removed during the passage of the water through the beds, this treatment for removal of suspended matter being entirely independent of that for effecting fluoridation.

It is therefore an object of the present invention to provide a novel method of fluoridation of municipal water supplies and the like which obviates the dangers necessarily inherent in the use of sodium fluoride or hydrogen for a like purpose; which is as effective as the customary methods employing those materials in obtaining the desired fluoridation, and which can be practiced without the necessity of re-arrangement of the water supplying plants or the installation of new apparatus therein and at a cost not in excess of and frequently lower than that of the said methods.

A further object is the provision of such method which is essentially of self-regulating character insofar as the extent of fluoridation is effected thereby in that in its practice the fluorine content imparted to the water cannot attain an amount inimical to health even though within reasonable limits an excess of the fluoridating material be supplied through accident or design.

The invention further contemplates in its broader aspect the provision of a novel method of treatment of municipal water supplies whereby through introduction to the water of a single material readily soluble therein not only is fluoridation effected but the water also conditioned for coagulation and precipitation of contained suspended matter.

A still further object is to provide a novel material for use in the practice of my invention.

Additional objects, advantages, novel steps and procedures comprehended by the invention are hereinafter more particularly pointed out or will be apparent to those skilled in the art as the following description of it proceeds.

Calcium fluoride ($CaF_2$) is a non-toxic substance which can be handled without injury, is not appreciably corrosive or otherwise destructive of apparatus in which it may be contained, and I have found it readily soluble in dilute solutions of aluminum sulfate ($Al_2(SO_4)_3$). Accordingly in the practice of my invention I first prepare a suitable quantity of my fluoridation material by digesting calcium fluoride in a dilute aqueous solution of aluminum sulfate, preferably about 5% $Al_2(SO_4)_3$ although up to about 17.5% may be used but with better recovery at the lower values, for a period of about 6 hours @ 75°–95° C., and, at the conclusion of said period, filtering or allowing the reaction product to settle so as to separate the liquid from the solid residue consisting principally of calcium sulfate ($CaSO_4$). The liquid is then evaporated nearly to dryness, the solid residue thereof carefully dried and finally pulverized in appropriate apparatus to condition it for introduction to the water which is to be treated. The reaction just described may be qualitatively represented by the equation:

$$CaF_2 + Al_2(SO_4)_3 + 2H_2O \rightarrow CaSO_4 + 2AlFSO_4 \cdot H_2O$$

which, it will be noted, gives an atomic ratio of 1:1 for fluorine and aluminum in the reaction product.

In the treatment of the water in accordance with the method of my invention this pulverized material is fed into the water during its passage through the water treating plant, and as it is readily soluble it dissolves and mixes with the water giving up thereto its contained fluorine and simultaneously conditioning the water for coagulation in a flocculent precipitate, either spontaneously or upon subsequent lime or sodium carbonate treatment, of much of the matter suspended in the water; the precipitate is then permitted to settle and the water passed through the filter beds in the usual way.

Instead of preparing the fluoridation material directly from calcium fluoride and a dilute solution of aluminum sulfate as above described, a slightly different method will sometimes be found desirable, namely, digesting together calcium fluoride and hydrated alumina in dilute sulfuric acid, for example 10 grams calcium fluoride, 20 grams hydrated alumina, 42 grams $H_2SO_4$ in 300 grams of water, the reaction being qualitatively represented by the following equation:

$$CaF_2 + Al_2O_3 \cdot 3H_2O + 3H_2SO_4 \rightarrow CaSO_4 + 2AlFSO_4 \cdot H_2O + 4H_2O$$

while a still further modification contemplates digesting the calcium fluoride with bauxite or other alumina clay in dilute sulfuric acid, in either case the treatment following the period of digestion being similar to that already described.

The following are exemplary of preparation of the fluoridation material in commercial quantities:

1. One pound of calcium fluoride, 7.7 lbs. of alum ($Al_2(SO_4)_3 \cdot 14H_2O$) and 30 lbs. of water were mixed and heated at 80–90° C. for four hours. The undissolved solid was allowed to settle and the solution was evaporated to get almost six lbs. of water soluble solid containing Al, F, $SO_4$ in ratio corresponding to formula $AlFSO_4$.

2. One pound of calcium fluoride, 2 lbs. of aluminum trihydrate ($Al_2O_3 \cdot 3H_2O$), 4.2 lbs. of 96% sulfuric acid and 30 lbs. of water were mixed and digested at 80–90° C. for six hours. The insoluble matter was separated out and the clear liquor was evaporated to get 7 lbs. of solid similar to that obtained in Example 1.

Particularly in the preparation of large quantities of the fluoridation material one of the procedures employing hydrated alumina or bauxite as above described may be preferred to that employing aluminum sulfate since if aluminum sulfate is first prepared separately a highly concentrated sulfuric acid must be used to dissolve the alumina whereas in the presence of calcium fluoride alumina dissolves readily in less concentrated acid so that in accordance with said procedures the desired fluoridating material may generally be prepared with fewer operations and frequently more economically than when previously prepared aluminum sulfate is used, the resultant fluoridating material, however, being the same in either case. The said material may also be produced in accordance with the disclosure of my copending application Serial No. 175,289, filed July 21, 1950.

The introduction of the fluoridating material to the water to be treated is conveniently made at the same point and with the same apparatus as is normally used for the introduction of the alum but of course it may be made at any other point appropriate to give the fluoridation material the opportunity to fully dissolve and the aluminum component to precipitate.

It is generally considered the most desirable therapeutic results are obtained with water containing approximately 1 part of fluorine per million parts of water (1 p. p. m.), smaller amounts of fluorine being deemed as less effective in the prevention of dental caries and somewhat greater amounts often producing a mottled condition of the teeth. This desideratum of 1 p. p. m. can readily be obtained in accordance with the invention by feeding appropriate amounts of the said material to the water and determining the subsequent fluoridation thereof by the usual tests; thus where the natural water contains a small amount of fluorine less of the said material will usually be required than where the natural water is devoid of any fluorine.

Mention has been made of the self-regulating character of my method which operates to limit the extent of fluoridation of the water even though through accident or design a quantity of the fluoridating material be supplied considerably in excess of that which should be utilized to obtain a concentration approximating 1 p. p. m. This is believed to result from the affinity of active alumina for fluorine in consequence of which the floc resulting from addition of my fluoridating material and subsequent lime or sodium carbonate treatment if employed begins to absorb or adsorb fluorine when the fluorine concentration reaches about 2.5 p. p. m., and so prevents it from attaining a much greater value in solution. While a concentration of 2.5 p. p. m. F is normally less desirable than one approximating 1 p. p. m., it is nevertheless not inimical as is demonstrated by the fact that the natural water containing approximately 2.6 p. p. m. fluorine supplied to the city of Colorado Springs, Colorado, has been drunk for years by the inhabitants without injury to their health.

It will now be apparent that my invention marks a distinct advance in the treatment of municipal water supplies and the like in that among other things it obviates the use of toxic chemicals which are dangerous to handle, destructive of apparatus with which they are brought into contact and which, largely because of the use of sodium fluoride in rat and similar poisons, are not favored by the consuming public as ingredients, even in minor quantities, of its drinking water. Additionally, my invention can be practiced as cheaply as and frequently more cheaply than the usual methods of fluoridation and alum addition since the ingredients entering into my fluoridating material are relatively inexpensive and readily obtainable, its preparation is neither arduous nor expensive, and its use requires no changes in or addition to existing plant equipment, while because of its self-regulating character the fluoridation cannot be carried to a point which is dangerous to health even though excessive amounts of the fluoridating material be introduced to the water.

Tests in the actual treatment of a municipal water supply made under supervision of the municipal engineers in charge and of independent authorities on water treatment have demonstrated conclusively the effective and satisfactory results attained by use of the invention and the material contribution to the art which has been made thereby.

While certain of the properties and characteristics of my novel fluoridating material are known, and have herein been mentioned, and its chemical composition has been assumed as AlFSO$_4$, it has not been established it consists wholly or even in part of this specific compound, although analysis has indicated by average values the presence of the several elements in at least approximately this proportion.

It will nevertheless be recognized that in its precise chemical composition it may be a mixture of several compounds respectively containing aluminum, fluorine, sulfur and oxygen in different proportions, or but two or three of said elements, although there are strong indications that the contained sulfur and oxygen are largely if not entirely present in the sulfate radical.

While I have herein described with considerable particularity certain ways of preparing my fluoridation material and of its use in the practice of my invention, it will be understood I do not thereby intend to restrict or confine myself thereto or thereby as changes in the procedure and the like within the scope of the appended claims will readily occur to those skilled in the art and may be made if desired.

Having thus described my invention, I claim and desire to protect by Letters Patent of the United States:

1. The method of treating water supplies of municipalities which consists in supplying thereto a water soluble finely pulverulent material containing the aluminum and fluorine bearing reaction product AlFSO$_4$ of calcium fluoride and a solution of aluminum sulfate adapted when dissolved in the water under conditions of sufficient alkalinity therein for coagulation to release thereto fluorine and aluminum thereby to fluoridate the water in amount not in excess of 2.5 parts of fluorine per million parts of water and to supply the aluminum component of a subsequently formed flocculent precipitate for entraining suspended mineral matter initially contained in the water.

2. The method of treating the water supply of a municipality which comprises introducing into the water a water soluble pulverulent solid consisting of the aluminum and fluorine bearing product of reaction between calcium fluoride and aluminum sulfate in dilute aqueous solution and consisting primarily of a compound of the formula AlFSO$_4$, whereby under conditions of alkalinity sufficient for coagulation to create in conjunction with the aluminum component of the solid a flocculent precipitate and to release fluorine ions for solution in the water to impart thereto not exceeding about 2.5 parts per million.

3. The method of treating municipal water supplies to impart thereto a predetermined fluorine content of less than about 2.5 parts per million and to form therein a flocculent aluminum containing precipitate which consists in introducing to the water under alkaline conditions sufficient for coagulation a product responding substantially to the formula AlFSO$_4$ obtained by digesting in water containing sulfuric acid, finely divided calcium fluoride and an alumina-bearing material, the latter two in such proportions as to give an atomic ratio of about 1:1 for fluorine and aluminum, separating the resulting solution from undissolved materials, then evaporating water from the solution and finally pulverizing the solid residue.

WAYNE E. WHITE.

References Cited in the file of this patent

UNITED STATES PATENTS

| Number | Name | Date |
|---|---|---|
| 1,705,589 | Sanford | Mar. 19, 1929 |

OTHER REFERENCES

Nikolaev, Chemical Abstracts, vol. 32, col. 734, 1938.

Ford, Textbook of Mineralogy, 3rd edition, page 402, 1922.

Ehret et al., J. Am. Chem. Soc., vol. 67, pages 68–71, 1945.

J. Am. Water Works Assoc., vol. 39, pages 701, 702, 1947.